United States Patent [19]
Rosati

[11] 3,952,583
[45] Apr. 27, 1976

[54] APPARATUS AND METHOD FOR THE REMOTE DETECTION OF VIBRATIONS OF DIFFUSE SURFACES

[75] Inventor: Vincent J. Rosati, Oakhurst, N.J.

[73] Assignee: The United States of America as represented by the Secretary of the Army, Washington, D.C.

[22] Filed: Jan. 2, 1975

[21] Appl. No.: 538,050

[52] U.S. Cl. .................................. 73/71.3; 356/109
[51] Int. Cl.² ............................................ G01H 9/00
[58] Field of Search ............ 73/71.3; 356/109, 196, 356/209, 256, 5; 340/261

[56] References Cited
UNITED STATES PATENTS

| | | | |
|---|---|---|---|
| 3,476,483 | 11/1969 | Weeks | 356/256 |
| 3,702,737 | 11/1972 | Mottier | 73/71.3 X |
| 3,804,521 | 4/1974 | Sprague | 356/109 |

OTHER PUBLICATIONS

N. Fernelius et al., Vibration Analysis Using Changes of Laser Speckle, J.O.S.A., May 1971, pp. 566–572.

*Primary Examiner*—Richard C. Queisser
*Assistant Examiner*—John P. Beauchamp
*Attorney, Agent, or Firm*—Nathan Edelberg; Robert P. Gibson; Frank J. Dynda

[57] ABSTRACT

Apparatus and method for the remote detection of vibrations of diffuse surfaces. A beam of coherent light incident on a vibrating diffuse surface is scattered. A photodetector sees the scattering as a time-varying intensity distribution related to the vibration frequency of the surface. The detected time-varying intensity distribution is converted into time-varying electrical currents which can be rendered audible by using a loudspeaker or visual by using an oscilloscope.

14 Claims, 1 Drawing Figure

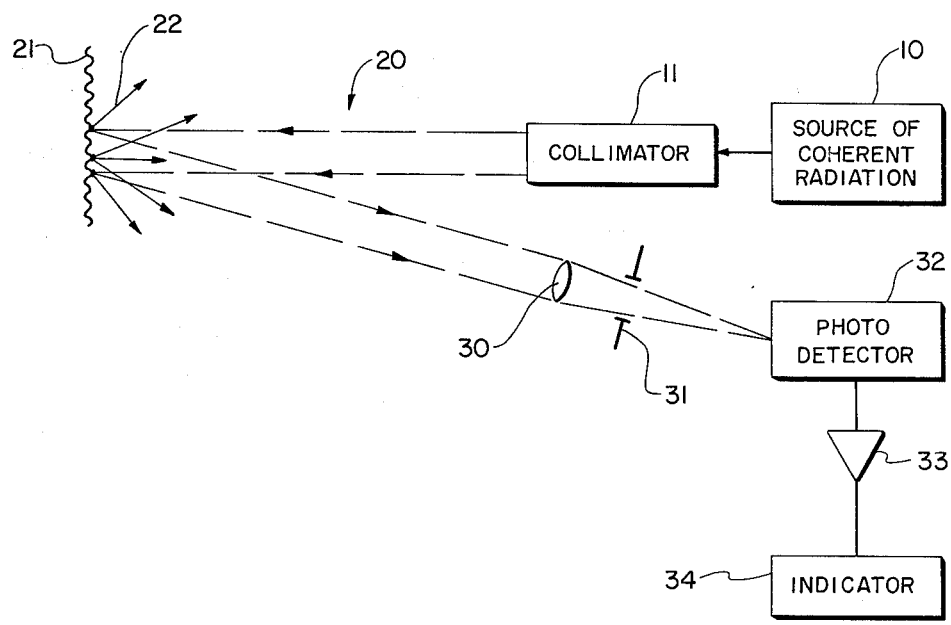

APPARATUS AND METHOD FOR THE REMOTE DETECTION OF VIBRATIONS OF DIFFUSE SURFACES

BACKGROUND OF THE INVENTION

1. Field of the Invention

This invention relates to the remote detection of vibrations of diffuse surfaces, and more particularly to the use of a beam of coherent light which is scattered by the vibration of the diffuse surfaces and then detected as a time-varying intensity distribution.

2. Description of the Prior Art

In the field of covert surveillance, it is often necessary to secretly monitor from a distance conversations, movements of people, and movements of vehicles. As such there exists a need for a novel method and apparatus for the remote detection of such items.

Heretofore, such surveillance has been accomplished by using hidden microphones, interferometers, and microwave equipments. Use of each of these items has presented numerous problems. Hidden microphones, when detected, can be easily destroyed. Interferometers require a visible light wave for operation. In addition extremely precise alignment of the interferometer mirrors is of the utmost importance. Microwave equipments are cumbersome for covert surveillance.

SUMMARY OF THE INVENTION

The subject invention provides a novel method and apparatus for the covert surveillance of distant conversations, movements of people, movements of vehicles, and the like. This is accomplished by the remote detection of vibrations of a diffuse surface of which some examples are windows, window shades, door panels, walls and trees.

The remote detection is accomplished by the employment of coherent radiation. A beam of coherent radiation is projected onto the diffuse surface to be monitored. The diffuse surface is composed of randomly distributed points. The beam of coherent radiation is scattered by these points. This results in a time-varying intensity distribution, which is dependent on the vibration frequency of the diffuse surface. The time-varying intensity distribution is detected by a photodetector and converted into time-varying electrical currents. These currents are used to activate a loudspeaker for audible display or an oscilloscope for visual display. In addition these currents can be used to activate an alarm or a similar device.

It is an object of the subject invention to provide a method and apparatus for the remote detection of vibrations of diffuse surfaces.

It is a further object to employ both visible and invisible wavelengths of coherent radiation in a method and apparatus to carry out the remote detection process.

It is yet another object to eliminate the need for precise alignment of the apparatus with the diffuse surface under surveillance.

It is still a further object to provide apparatus which requires little power to carry out the remote detection process.

Other objects and advantages of this invention will further become apparent hereinafter and in the drawing.

BRIEF DESCRIPTION OF THE DRAWING

The lone FIGURE is a diagram of the preferred embodiment of the subject invention.

DESCRIPTION OF THE PREFERRED EMBODIMENT

Referring now to the lone FIGURE, a diagram of the preferred embodiment of the apparatus for the remote detection of vibrations of diffuse surfaces is shown.

A source of coherent radiation 10 provides a beam of coherent radiation 20, which is projected and focused onto a target 21 by a collimator 11. The beam 20 is then scattered off of the surface of the target 21. A telescope 30 aimed at the portion of the surface of the target where the beam 20 was originally projected collects and focuses the beam 20 onto a photodetector 32. An aperture 31 is provided in the telescope 30 as a means for "tuning" to obtain the best signal-to-noise ratio. The photodetector 32 then converts the beam into electrical currents, which are amplified in amplifier 33 to bring the currents up to a point where the indicator 34 may be driven.

The source of coherent radiation 10 may be any source of radiation in which definite phase relationships exist between radiation considered at differing points in a cross section of the radiant energy beam. For overt operation of the subject invention a filtered arc or gas discharge lamp, or a laser operable in the visible spectrum may be used. For covert operation of the subject invention a laser operable in either the infrared or ultraviolet regions of the electromagnetic spectrum can be used. In the experimental model of the preferred embodiment a 50mW, He-Ne, 6328 A laser was used.

The collimator 11 may be replaced by any device which produces a beam of parallel rays of the coherent radiation. The collimator 11 is chosen to obtain an optimum spot size of the beam 20 on the target 21. In the experimental model a collimating telescope having a 16X magnification was used.

The target 21 may be any diffusely scattering surface having randomly distributed points on the surface and which is caused to vibrate by voices, footfalls, vehicles, and the like. Among the many possible targets are windows, window shades, door panels, walls and trees.

The photodetector 32 may be any device utilizing the photoelectric effect produced by electromagnetic radiations impinging on a photocathode. In the experimental model a 1N2175 germanium photodiode was used. The working range of the preferred embodiment can be considerably increased by the substitution of a photomultiplier in place of the photodiode. If the photodetector 32 has a small active area it may be used alone. If however, the active area is large an auxiliary aperture and beam spreading lens must be used.

In operation, the beam of coherent radiation 20 projected onto the surface of the target 21 is scattered by the randomly distributed points on the surface. These scatter points 24 act as secondary radiators of random phase. Waves from these scatter points 24 arriving at the photodetector 32 will interfere with each other, causing the surface of the target 21 to be seen as covered with light and dark splotches, called speckles.

The detector 32 is held fixed and the target 21 under observation is vibrated. As such, the detector 32 now sees a time-varying intensity distribution related to the motion of the target 21. If the detector surface is large, e.g., a photomultiplier cathode, all that will be seen is an average change in intensity. The average may be zero. However, if the detector surface area is small, or if a small aperture 31 is placed in front of the detector 32, the averaging effect is reduced, and, as a consequence, the intensity variations are enhanced. These intensity variations comprise the desired signal which is amplified by amplifier 33 and fed to indicator 34. For signals in the sonic range the indicator 34 may be a loudspeaker or the like. For ultrasonic and subsonic signals the indicator 34 may be a cathode ray oscilloscope or the like. In selecting the size of the detector surface area or the aperture 31, the diameter of the detector surface or the aperture 31 is preferably on the order of 30 to 50 microns; the diameter being proportional to the distance between the target 21 and the detector 32, and inversely proportional to the roughness of the surface of the target 21.

Obviously many modifications and variations of the present invention are possible in light of the above teachings. It is therefore to be understood that within the scope of the appended claims, the invention may be practiced otherwise than as specifically described.

What is claimed is:

1. Apparatus for the remote detection of vibrations of a diffuse surface having randomly distributed points comprising:
   means for providing a source of coherent radiation;
   means for projecting a beam of said coherent radiation onto said diffuse surface; and
   means, separate and independent of said source, for detecting a reflected time-varying intensity distribution resulting from a scattering of the photons of said beam of coherent radiation by said randomly distributed points on said surface as said surface vibrates and producing corresponding electrical signals.

2. The apparatus according to claim 1 wherein said source of coherent radiation comprises a laser.

3. The apparatus according to claim 1 wherein said source of coherent radiation comprises a filtered arc lamp.

4. The apparatus according to claim 1 wherein said projecting means further comprises means for producing parallel rays of said beam of coherent radiation.

5. The apparatus according to claim 1 wherein said detecting means comprises:
   means for collecting and focusing said time-varying intensity.

6. The apparatus according to claim 5 wherein said detecting means comprises:
   means for translating said electrical signals into sensorially perceivable signals.

7. The apparatus according to claim 6 wherein said translating means comprises an audible display device.

8. The apparatus according to claim 7 wherein said audible display device is a loudspeaker.

9. The apparatus according to claim 6 wherein said translating means comprises a visual display device.

10. The apparatus according to claim 9 wherein said visual display device is an oscilloscope.

11. A method for the remote detection of vibrations of diffuse surfaces comprising the steps of:
    projecting a beam of coherent radiation from a coherent light source onto said diffuse surface; and
    detecting, separately and independently of said source, a reflected time-varying intensity distribution resulting from a scattering of the photons of said beam of coherent radiation by said diffuse surface as said surface vibrates and producing corresponding electrical signals.

12. The method according to claim 11 wherein said beam of coherent radiation is produced by a laser.

13. The method according to claim 11 wherein the detecting step comprises
    collecting and focusing said time-varying intensity distribution.

14. The method according to claim 13 wherein said detecting step comprises
    translating said electrical signals into sensorially perceivable signals.

* * * * *